United States Patent
Shimada et al.

(10) Patent No.: US 8,026,955 B2
(45) Date of Patent: Sep. 27, 2011

(54) CAMERA EXPOSURE CONTROLLER INCLUDING IMAGING DEVICES FOR CAPTURING AN IMAGE USING STEREO-IMAGING

(75) Inventors: Takamichi Shimada, Wako (JP); Nobuo Higaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 12/230,129

(22) Filed: Aug. 25, 2008

(65) Prior Publication Data
US 2009/0059033 A1  Mar. 5, 2009

(30) Foreign Application Priority Data

Aug. 30, 2007  (JP) .................. 2007-224753
Aug. 30, 2007  (JP) .................. 2007-224754

(51) Int. Cl.
*H04N 5/235* (2006.01)
(52) U.S. Cl. .................. 348/229.1; 348/362; 348/221.1; 348/48
(58) Field of Classification Search .......... 348/221.1, 348/229.1, 362, 48
See application file for complete search history.

(56) References Cited

U.S. PATENT DOCUMENTS

| | | | |
|---|---|---|---|
| 5,589,880 A * | 12/1996 | Tsukui | 348/229.1 |
| 5,606,630 A | 2/1997 | Maeda et al. | |
| 2003/0174216 A1* | 9/2003 | Iguchi et al. | 348/223.1 |
| 2003/0210345 A1* | 11/2003 | Nakamura et al. | 348/362 |
| 2004/0041928 A1 | 3/2004 | Hirakoso et al. | |
| 2004/0197014 A1* | 10/2004 | Oohashi | 382/118 |
| 2005/0140819 A1 | 6/2005 | Kawamura et al. | |
| 2005/0231630 A1* | 10/2005 | Kawanishi | 348/362 |
| 2006/0165406 A1* | 7/2006 | Makii | 396/349 |
| 2006/0214463 A1* | 9/2006 | Sahara et al. | 296/97.4 |
| 2006/0268151 A1* | 11/2006 | Yamashita | 348/362 |
| 2007/0013806 A1* | 1/2007 | Kao | 348/362 |

(Continued)

FOREIGN PATENT DOCUMENTS

EP  1 087 205 A2  3/2001

(Continued)

OTHER PUBLICATIONS

European Search Report, 43960P EP/HGpv, dated Dec. 12, 2008.

(Continued)

*Primary Examiner* — Sinh Tran
*Assistant Examiner* — Kent Wang
(74) *Attorney, Agent, or Firm* — Squire, Sanders & Dempsey (US) LLP

(57) ABSTRACT

In an exposure controller of a camera mounted on a robot for taking an image utilizing incident light from external world in which an object such as a human being is present, a brightness histogram of the image is generated and exposure parameters are set based on the generated histogram. Then, it is determined whether the set exposure parameters are within a predetermined range and when they are out of the range and if a high-brightness imaging region is present in the image due to high-brightness incident light, it is again determined whether it is necessary to remove the high-brightness imaging region. When it is determined to be necessary, the high-brightness imaging region is extracted and is removed from the image, thereby enabling the camera to image the object with suitable brightness even when a bright light source such as the sun is within the camera angle of view.

18 Claims, 14 Drawing Sheets

U.S. PATENT DOCUMENTS

| | | | |
|---|---|---|---|
| 2007/0086777 A1* | 4/2007 | Fujita | 396/452 |
| 2007/0171298 A1* | 7/2007 | Kurane | 348/362 |
| 2007/0263097 A1* | 11/2007 | Zhao et al. | 348/221.1 |

FOREIGN PATENT DOCUMENTS

| | | |
|---|---|---|
| JP | 10-042665 A | 2/1998 |
| JP | 2000-341719 | 12/2000 |
| JP | 2001-199492 | 7/2001 |
| JP | 2002-154084 A | 5/2002 |
| JP | 2002-205290 A | 7/2002 |
| JP | 2002-269545 | 9/2002 |
| JP | 2002-277922 | 9/2002 |
| JP | 2003-078982 A | 3/2003 |
| JP | 2004-343177 | 12/2004 |
| JP | 2005-045453 A | 2/2005 |
| JP | 3726081 | 9/2005 |
| JP | 2006-011623 A | 1/2006 |
| JP | 2006-015435 A | 1/2006 |
| JP | 2006-129084 | 5/2006 |
| JP | 2006-301287 A | 11/2006 |
| JP | 2006-347276 A | 12/2006 |
| JP | 2007-038994 A | 2/2007 |
| JP | 2007-096684 | 4/2007 |
| JP | 2007-160434 A | 6/2007 |
| JP | 2007-212745 | 8/2007 |

OTHER PUBLICATIONS

Japanese Office Action, Japanese Patent Application No. JP2007-224754, Date of Preparation: Mar. 15, 2011, Date of Mailing: Apr. 12, 2011, pp. 1-2, English Translation: pp. 1-2.

Japanese Notification of Grounds for Rejection dated May 24, 2011 corresponding to Japanese Patent Application No. JP2007-224753.

* cited by examiner

CAMERA EXPOSURE CONTROLLER INCLUDING IMAGING DEVICES FOR CAPTURING AN IMAGE USING STEREO-IMAGING

BACKGROUND OF THE INVENTION

1. Field of the Invention

This invention relates to a camera exposure controller, particularly to an exposure controller for a camera mounted on a mobile object.

2. Description of the Related Art

As set out in Japanese Laid-Open Patent Application No. 2006-129084, for example, technologies have been developed for predicting the location, shape and the like of a ghost formed on the imaging plane of an imaging device by internal reflection when a bright light source like the sun falls within the angle of view of a camera, determining which portion of the taken image is the ghost, and correcting (reducing) the determined ghost portion in response to photographer instructions or automatically.

SUMMARY OF THE INVENTION

Although the technology of the reference is intended for application to a digital camera or video camera used by a photographer to photograph an object of imaging such as a human being, a camera of this type is also sometimes used as a visual sensor mounted on a mobile robot or other mobile object.

In such a case, since it is unknown whether the object desired to be imaged is included in the area that will be imaged, the exposure parameters are adjusted based on distance information. When a bright light source such as the sun or a spotlight is present within the camera angle of view as shown in FIG. 19, an attempt to avoid brightness saturation by increasing the shutter speed and/or stopping down the lens (iris-out) blots out the brightness of the object to be imaged, so that an image suitable for imaged object extraction or other processing sometimes cannot be obtained. In FIG. 19, a human being actually present on the right side of the image cannot be discerned.

The object of this invention is to overcome this problem and to provide an exposure controller for a camera mounted on a mobile object that enables the camera to image an object with suitable brightness even when a bright light source such as the sun is within the camera angle of view.

In order to achieve the object, this invention provides a camera exposure controller having at least two imaging devices mounted on a mobile object for taking an image, through stereo-imaging, utilizing incident light from external world in which an object of imaging is present, comprising: exposure parameter setting means for generating a brightness histogram of the image taken by the imaging devices and setting exposure parameters including a shutter speed based on the generated brightness histogram; high-brightness imaging region removal necessity determining means for determining whether the set exposure parameters are within a predetermined range, and when they are found to be out of the predetermined range, for determining whether a high-brightness imaging region is present in the image due to high-brightness incident light, and when the high-brightness imaging region is present in the image, for determining whether it is necessary to remove the high-brightness imaging region; and high-brightness imaging region extraction and removal means for extracting the high-brightness imaging region and for removing it from the image, when it is determined that removal of the high-brightness imaging region is necessary.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Figure 1:
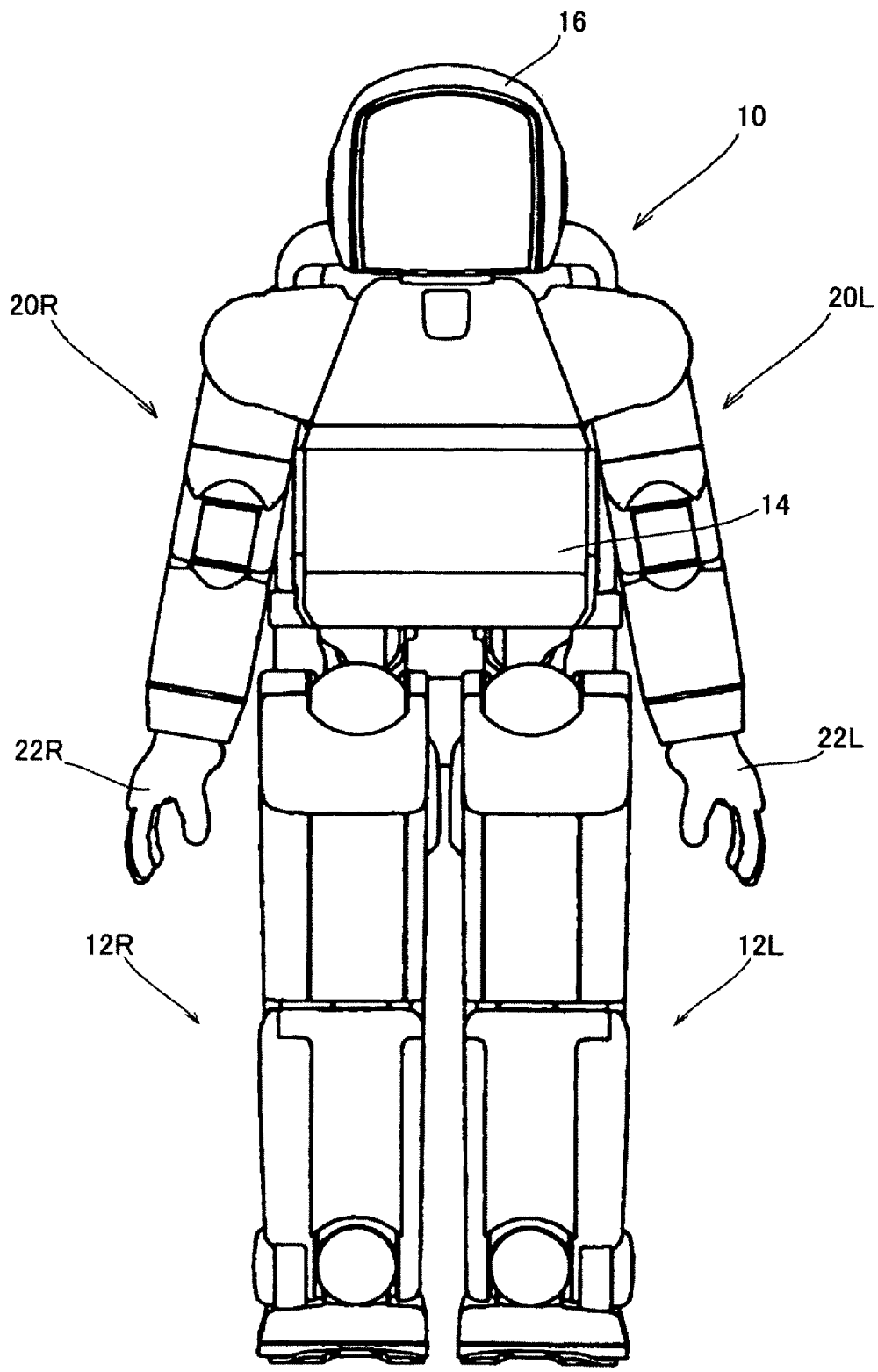
FIG. 1 is a front view of a legged mobile robot, i.e., a mobile object, on which a camera exposure controller according to embodiments of this invention is mounted.
Figure 2:
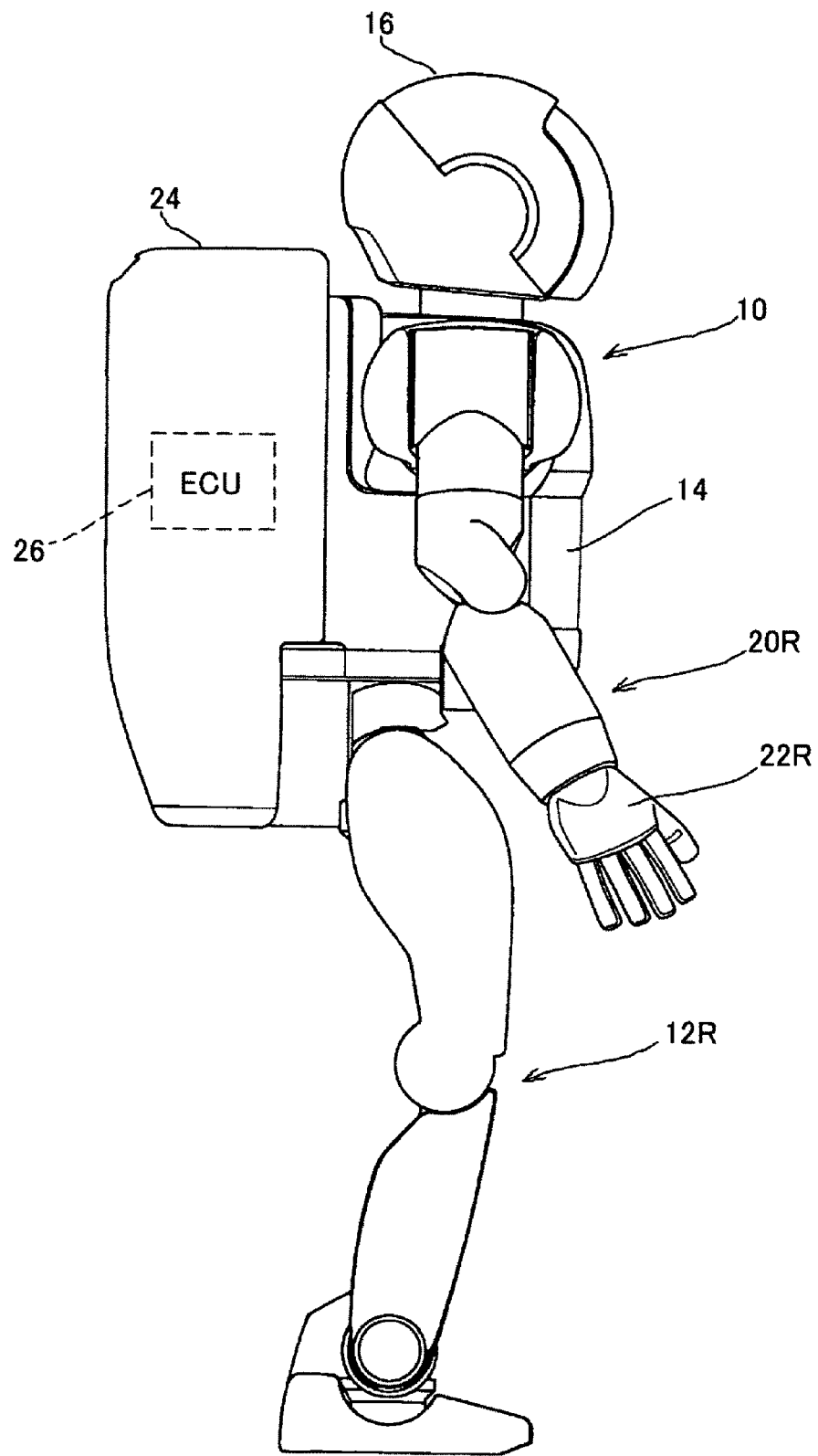
FIG. 2 is a side view of the robot shown in FIG. 1.

FIG. 1 is a front view of a legged mobile robot, i.e., a mobile object, on which a camera exposure controller according to a first embodiment of this invention is mounted. FIG. 2 is a side view of the robot shown in FIG. 1.

As shown in FIG. 1, the legged mobile robot (mobile object), designated by the reference symbol 10 in the drawings and sometimes referred to simply as "robot" hereinafter, is equipped with left and right legs 12L, 12R. Here and hereinafter L and R are used to indicate left and right. The legs 12L, 12R are connected to the bottom of a body 14. A head 16 is connected to the top of the body 14 and left and right arms 20L, 20R are connected to opposite sides of the body 14. Hands (end effectors) 22L, 22R are connected to the distal ends of the left and right arms 20L, 20R. In this embodiment, the legged mobile robot is exemplified by a humanoid robot that has two legs and two arms and stands to a height of about 1.3 m.

As shown in FIG. 2, a storage unit 24 is mounted on the back of the body 14. The storage unit 24 houses, inter alia, an Electronic Control Unit (ECU) 26 and a battery (not shown).

Figure 3:
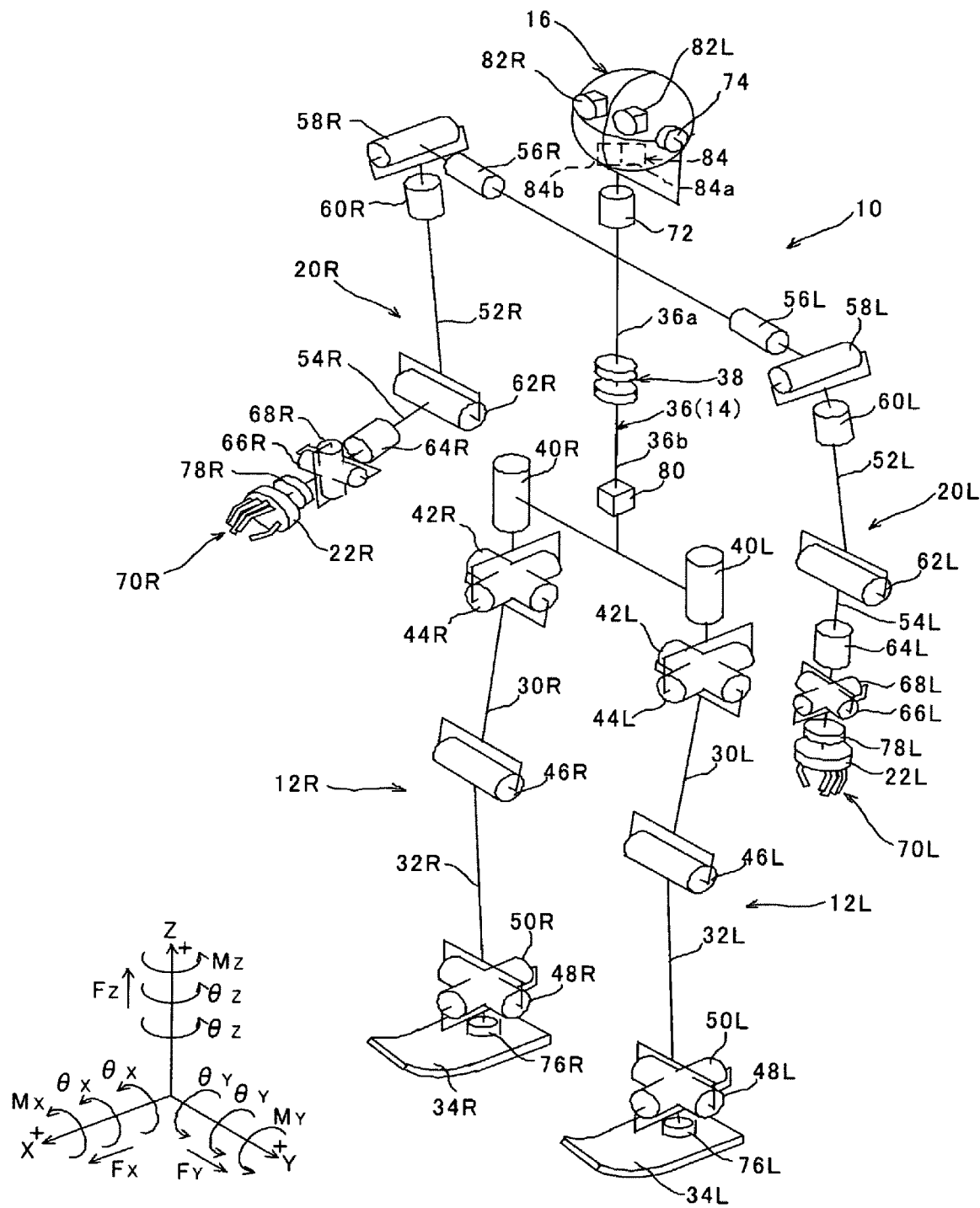
FIG. 3 is an explanatory diagram showing a skeletonized view of the robot shown in FIG. 1.

FIG. 3 is an explanatory diagram showing a skeletonized view of the robot 10 shown in FIG. 1. The internal structures of the robot 10 will be explained with reference to this drawing, with primary focus on the joints. Since the illustrated robot 10 is laterally symmetrical, affixation of L and R will be omitted in the explanation of FIG. 3.

The left and right legs 12 are each equipped with a thigh link 30, a shank link 32, and a foot member 34. The thigh link 30 is connected to the body 14 through a hip (crotch) joint. The body 14 is shown schematically in FIG. 3 as a body link 36. The body link 36 comprises an upper section 36a and a lower section 36b connected through a joint 38 to be movable relative to each other.

The thigh link 30 and shank link 32 are connected through a knee joint. The shank link 32 and the foot 34 are connected through an ankle joint. The hip joint comprises a rotary shaft 40 rotatable about a Z-axis (yaw axis), a rotary shaft 42 rotatable about a Y-axis (pitch axis), and rotary shaft 44 rotatable about an X-axis (roll axis). In other words, the hip joint has three degrees of freedom.

The knee joint comprises a rotary shaft 46 rotatable about the Y-axis and has one degree of freedom. The ankle joint comprises a rotary shaft 48 rotatable about the Y-axis and a rotary shaft 50 rotatable about the X-axis and has two degrees of freedom. Thus the left and right legs 12 are each imparted with 6 rotary shafts (degrees of freedom) constituting 3 joints, so that the legs as a whole are imparted with 12 rotary shafts (degrees of freedom).

The legs 12 are driven by actuators (not shown). The leg actuators that drive the legs 12 comprise 12 electric motors installed at appropriate locations on the body 14 and legs 12 to drive the 12 rotary shafts independently.

The left and right arms 20 are each equipped with an upper arm link 52 and a forearm link 54. The upper arm link 52 is connected to the body 14 through a shoulder joint. The upper arm link 52 and forearm link 54 are connected through an elbow joint, and the forearm link 54 and hand 22 are connected through a wrist joint.

The shoulder joint comprises a rotary shaft 56 rotatable about the Y-axis, a rotary shaft 58 rotatable about the X-axis, and a rotary shaft 60 rotatable about the Z-axis. It has three degrees of freedom. The elbow joint comprises a rotary shaft 62 rotatable about the Y-axis and has one degree of freedom. The wrist joint comprises a rotary shaft 64 rotatable about the Z-axis, a rotary shaft 66 rotatable about the Y-axis, and a rotary shaft 68 rotatable about the X-axis. It has three degrees of freedom. Thus the left and right arms 20 are each imparted with 7 rotary shafts (degrees of freedom) constituting 3 joints, so that the arms as a whole are imparted with 14 rotary shafts (degrees of freedom).

Like the legs 12, the arms 20 are also driven by actuators (not shown). The arm actuators that drive the arms 20 comprise 14 electric motors installed at appropriate locations on the body 14 and arms 20 to drive the 14 rotary shafts independently. The legs 12 and arms 20 of the robot 10 are imparted with desired movements by being controlled the operation of the leg actuators and arm actuators to drive the rotary shafts to suitable angles.

The hands 22 are each equipped with 5 fingers generally designated by the reference symbol 70. The fingers 70 are drivable by hand actuators (not shown) and can be operated in coordination with the arms 20 to grasp objects, point in a suitable direction and execute other such operations.

The head 16 is connected to the body 14 through a neck joint that comprises a rotary shaft 72 rotatable about the Z-axis and a rotary shaft 74 rotatable about the Y-axis. It has two degrees of freedom. The rotary shafts 72 and 74 are individually driven by head actuators (not shown). The head 16 can be faced in a desired direction by being controlled the operation of the head actuators to drive the rotary shafts 72 and 74 to suitable angles. The upper section 36a and lower section 36b can be rotated relative to each other by driving an actuator (not shown) installed at the joint 38.

A force sensor (six-axis force sensor) 76 attached to each of the left and right legs 12 produces outputs or signals representing the floor reaction force components Fx, Fy and Fz of three directions and the moment components Mx, My and Mz of three directions acting on the leg 12 from the floor. A similar force sensor 78 attached to each of the left and right arms 20 between the hand 22 and the wrist joint produces outputs or signals representing the external force components Fx, Fy and Fz of three directions and the moment components Mx, My and Mz of three directions acting on the arm 20.

An inclination sensor 80 installed on the body 14 produces outputs or signals representing state quantities of the body 14, including its inclination angle and angular velocity relative to the vertical axis. Two (left and right) CCD cameras (hereinafter sometimes called simply "cameras") 82 are installed in the head 16 for taking images utilizing incident light from the external world (ambience) in which a human being or other object to be imaged is present. A voice input/output device 84 comprising a microphone 84a and a speaker 84b is also installed in the head 16.

The outputs of the sensors and the like are sent to the ECU 26 (shown in FIG. 2). The ECU 26 is constituted as a microcomputer comprising a CPU, input/output circuits, ROM, RAM and other components, none of which are shown in the drawings.

Figure 4:
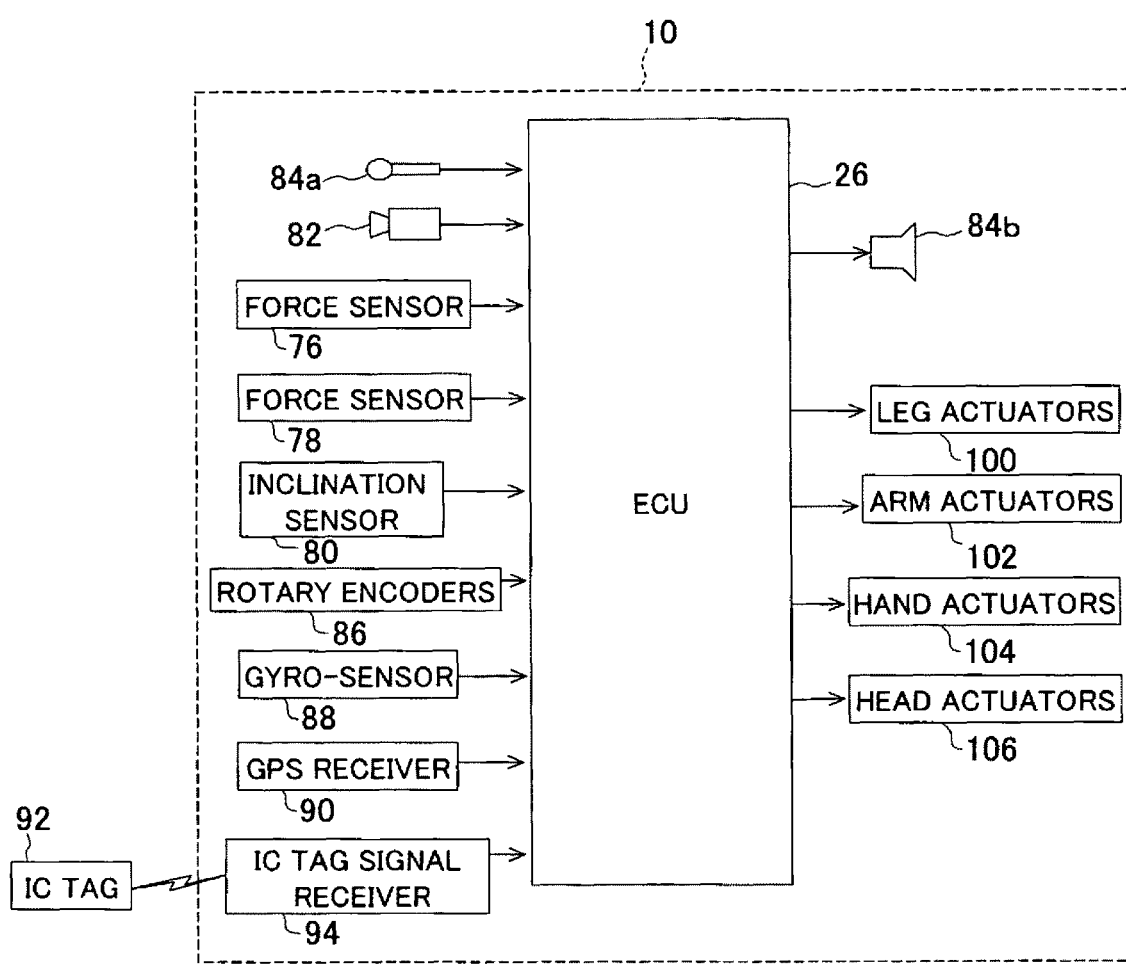
FIG. 4 is a block diagram showing the configuration of the robot shown in FIG. 1 primarily with regard to input/output of an electronic control unit (ECU)

FIG. 4 is a block diagram showing the configuration of the robot 10 primarily with regard to input/output of the ECU 26.

As illustrated, the robot 10 is equipped not only with the aforesaid sensors and the like but also with rotary encoders 86, a gyro-sensor 88, a Global Positioning System (GPS) receiver 90, and an IC tag signal receiver (reader) 94 wirelessly connected to an IC tag 92 carried (worn) by a human being (object of imaging) for receiving Integrated Circuit (IC) tag information transmitted by the IC tag 92.

The rotary encoders 86 produce outputs or signals indicative of the rotation angles, i.e. joint angles, of the respective rotary shafts 40 and the like. The gyro-sensor 88 produces an output or signal indicative of the direction and distance of movement of the robot 10. The GPS receiver 90 receives radio signals transmitted from satellites, acquires information on the position (latitude and longitude) of the robot 10, and sends the position information to the ECU 26. The IC tag signal receiver 94 wirelessly receives and sends to the ECU 26 identification information (RFID (Radio Frequency ID) information, specifically identification information identifying the human being who is the wearer of the IC tag 92)) stored in and transmitted from the IC tag 92.

The ECU 26 controls walking by generating a gait based on the outputs of the force sensors 76, inclination sensor 80, and rotary encoders 86. Specifically, it makes the robot 10 move (walk) by controlling the operation of leg actuators (designated 100) to drive the legs 12. The gait generation and walking control is performed in accordance with the teaching of Applicant's Japanese Patent No. 3726081 and will not be explained in detail here.

Concomitantly with the walking and other control, the ECU 26 further controls the operation of the arm actuators (designated 102) and the hand actuators (designated 104), thereby driving the arms 20 and hands 22, and controls the operation of the head actuators (designated 106), thereby regulating the orientation of the head 16.

In addition, the ECU 26 operates as an exposure controller of the cameras 82. Namely, it executes exposure control of the camera 82.

Figure 5:
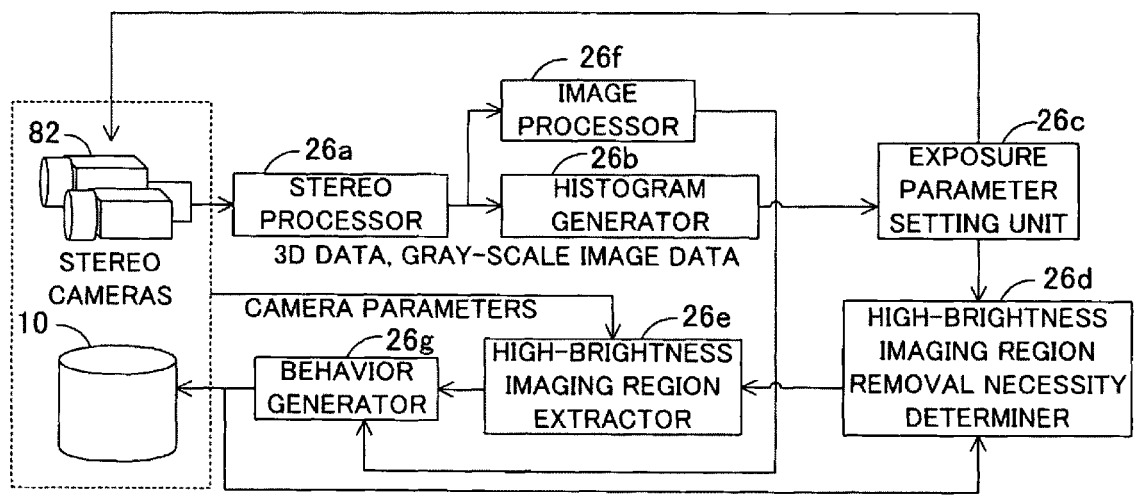
FIG. 5 is a block diagram functionally illustrating the configuration when the ECU shown in FIG. 4 operates as an exposure controller of cameras.

FIG. 5 is a block diagram functionally illustrating the configuration when the ECU 26 operates as the exposure controller of the cameras 82.

As can be seen, when the operations of the ECU 26 are viewed by function of the exposure controller, the ECU 26 comprises a stereo processor 26a, a histogram generator 26b, an exposure parameter setting unit 26c, a high-brightness imaging region removal necessity determiner 26d, a high-brightness imaging region extractor 26e, an image processor 26f, and a behavior generator 26g.

The stereo processor 26a inputs the outputs of the two cameras (imaging devices) 82 mounted on the mobile object (robot) 10 and adapted to take images utilizing incident light from the external world in which an object (of imaging), specifically a human being, is present. Upon inputting the outputs, it performs stereo processing to calculate distance information for each pixel from the parallax of the inputted images. The number of pixels of the cameras 82 is 320×240. The stereo processor 26a calculates and outputs three-dimensional (3D) data from gray-scale image data.

The histogram generator 26b creates brightness histograms of the taken images and weights them by distance or in accordance with distance.

The exposure parameter setting unit 26c defines an exposure parameter (specifically, shutter speed) based on the brightness at the distance desired to be imaged. Owing to the fact that the cameras 82 are installed in the robot 10 to function as a visual sensor, the cameras 80 do not themselves seek out objects (of imaging) but are required to extract objects (of imaging) from taken images. So the lenses of the cameras 82 are fixed at the smallest aperture (the iris is set to the minimum) and are adjusted to be in focus at a near distance, specifically between about 0.5 m and 2.5 m. Therefore, only the shutter speed is adjustable as an exposure parameter.

The high-brightness imaging region removal necessity determiner 26d determines whether it is necessary for obtaining proper exposure for imaging the object to remove from the image a high-brightness imaging region imaged therein due to high-brightness incident light.

The high-brightness imaging region extractor 26e extracts the high-brightness imaging region and calculates the position and angle of the high-brightness imaging region in a stage coordinate system, namely, a rectangular coordinate system whose x, y plane is the floor and whose origin is a point in the image area based on camera parameters of the cameras 82, when it is determined that removal of the high-brightness imaging region from the image is necessary. The high-brightness imaging region extraction is performed either by defining a region where the average brightness is greater than a threshold value as a high-brightness imaging region or by dividing the image into predetermined blocks, calculating the average brightnesses of the individual blocks and defining the block with the highest brightness as the center of a high-brightness imaging region.

The image processor 26f is responsive to movement of the robot 10 for performing image processing as a visual sensor. The behavior generator 26g generates a predetermined behavior of the robot 10 for removing the high-brightness imaging region from the image, based on the size and the like of the high-brightness imaging region.

The operation of the ECU 26 will now be explained in detail.

Figure 6:
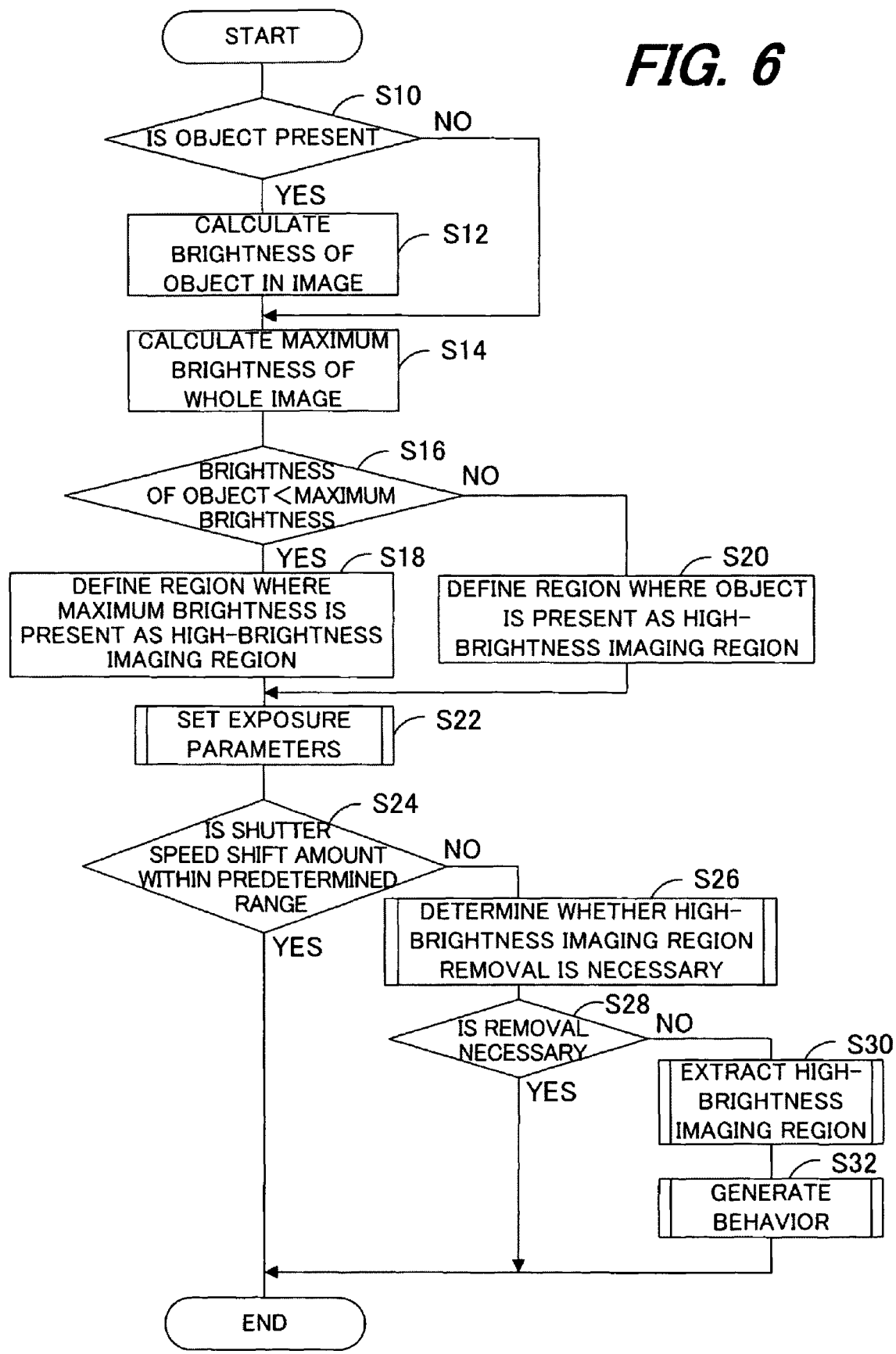
FIG. 6 is a flowchart showing the processing when the ECU operates as the exposure controller of the cameras, similarly to FIG. 5.

Like FIG. 5, FIG. 6 is a flowchart showing the processing when the ECU 26 operates as the exposure controller of the cameras 82. The illustrated program is executed at desired time intervals of, for example, 1 millisecond to 300 milliseconds.

In S10, it is checked whether an object (of imaging, i.e., a human being), is present. The presence/absence of an object (of imaging) is determined from the output of the IC tag signal receiver 94, which receives identification information transmitted by the IC tag 92 borne (worn) by the human being.

When the result in S10 is YES, the program goes to S12, in which the brightness of the image of the object (of imaging) taken by the cameras 82, specifically of the object (of imaging) in the image, is calculated, and to S14, in which the maximum brightness of the whole image including the object (of imaging) is calculated. When the result in S10 is NO, the processing of S12 is skipped.

Next, in S16, the calculated brightnesses are compared. When the maximum brightness is larger, the program goes to S18, in which a region where the maximum brightness is present is defined as the high-brightness imaging region, and when the brightness of the object (of imaging) is larger, the program goes to S20, in which a region where the object is present is defined as the high-brightness imaging region (In other words, the processing from S16 to S20 is amount to determining whether the high-brightness imaging region is present in the image). The processing from S10 to S20 is performed by the stereo processor 26a of FIG. 5. Next, in S22, processing for setting the exposure parameters is performed.

Figure 7:
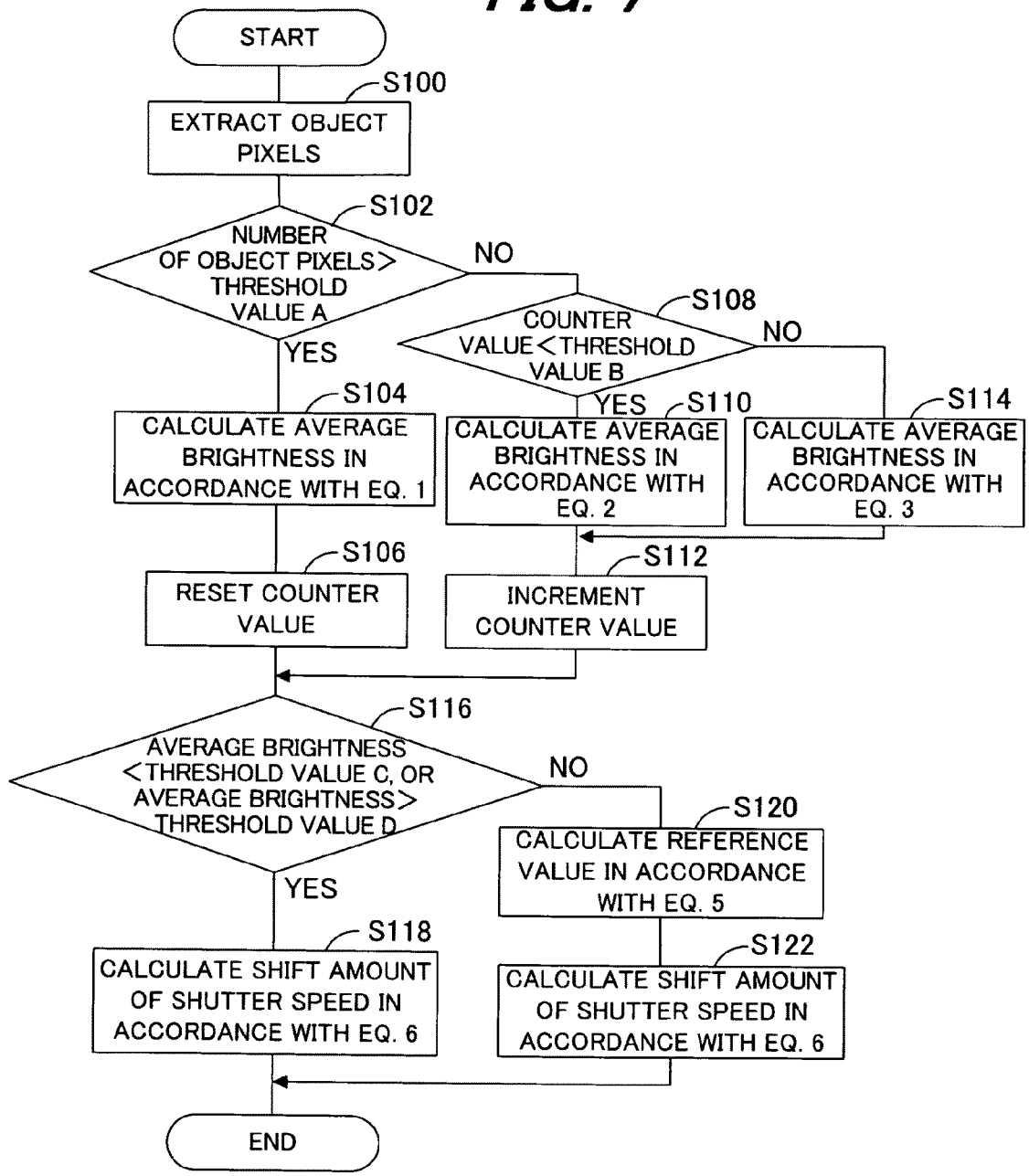
FIG. 7 is a subroutine flowchart showing the processing of setting exposure parameters in the flowchart of FIG. 6.

FIG. 7 is a subroutine flowchart of this processing, which is executed by the histogram generator 26b and exposure parameter setting unit 26c.

In S100, the object pixels are extracted. "Object pixels" as termed here means pixels carrying information for the distance at which exposure is to be adjusted. The extraction of the object pixels amounts to generating a brightness histogram of the image obtained by imaging the object (of imaging).

Next, in S102, it is checked whether the number of extracted pixels is greater than an appropriately set threshold value A. The threshold value A is a value set beforehand by calculating the area of the total image area to be accounted for by the object (of imaging) at the distance at which exposure is to be adjusted.

When the result in S102 is YES, the program goes to S104, in which the average brightness is calculated in accordance with the following Equation 1:

Average brightness=Previous frame average×(1−Extracted pixel number×Coefficient/Region pixel number)+Current frame average (Distance taken into account)×Extracted pixel number/Region pixel number     Eq. 1

Next, in S106, the value of a counter (up counter) to count the number of frames is reset or initialized. When the result in S102 is NO, the program goes to S108, in which it is checked whether the counter value is less than an appropriately set threshold value B. When the result is YES, the program goes to S110, in which average brightness is calculated in accordance with the following Equation 2:

Average brightness=Previous frame average×(1−Coefficient)+Current frame average×Coefficient  Eq. 2

The program then goes to S112, in which the counter value is incremented.

When the result in S108 is NO, the program goes to S114, in which the average brightness is calculated in accordance with the following Equation 3:

Average brightness=Current frame average  Eq. 3

The program then goes to S112.

In the forgoing Eq. 1, for example, "Previous frame average" is the value obtained by averaging the brightnesses of all pixels (pixels of the whole image area) of several frames of images (frames) taken at 200 millisecond intervals in the past, "Extracted pixel number" is the number of pixels extracted in S100, "Region pixel number" is the total number of pixels (pixels of the whole image area) including the extracted pixels, "Coefficient" is a correction coefficient derived from experience, and "Current frame average" is the value obtained by averaging the brightnesses of all pixels (pixels of the whole image area) imaged in the current cycle. Since, as pointed out earlier, all of the pixels carry distance information, the averaging of the pixel brightnesses is also performed taking distance into account.

Next, in S116, it is checked whether the average brightness calculated in S104, for example, is less than an appropriately set threshold value C, or is greater than a threshold value D. The threshold values C and D are set by empirically selecting values that enable image processing.

When the result in S116 is YES, the program goes to S118, in which a shift amount (amount of change) of shutter speed (one of the exposure parameters) is calculated (the exposure parameter is set) in accordance with the following Equation 4:

Shift amount=(Average brightness−Threshold values C, D/2)×Current shutter speed×Coefficient 1  Eq. 4

Specifically, in S118, the shutter speed shift amount is calculated to make the average brightness fall midway between the threshold value C and the threshold value D. Coefficient 1 is a correction coefficient determined from experience. As explained earlier, the lenses of the cameras 82 are fixed at the smallest aperture (i.e., the minimum iris) and only the shutter speed is made adjustable as an exposure parameter.

When the result in S116 is NO, the program goes to S120, in which a reference value is calculated in accordance with the following Equation 5:

Reference value=Average brightness−(Number of pixels greater than an effective brightness threshold value−Number of pixels less than an effective brightness threshold value)/Coefficient 2  Eq. 5

The program then goes to S122, in which the calculated reference value and the like are used to calculate a shift amount (amount of change) in shutter speed (to set the exposure parameter) in accordance with the following Equation 6:

Shift amount=(Average brightness−Reference value)× Current shutter speed×Coefficient 3  Eq. 6

The Coefficients 2 and 3 in Eq. 5 and Eq. 6 are also correction coefficients determined from experience.

The meaning of the processing of FIG. 7 will be further explained. The controller in this embodiment is directed to dealing with the problem of imaging an object (of imaging) at appropriate brightness in a situation where external light from the sun, for instance, enters through the incident light window to appear in the image, as shown in FIG. 8 by way of example.

Figure 8:
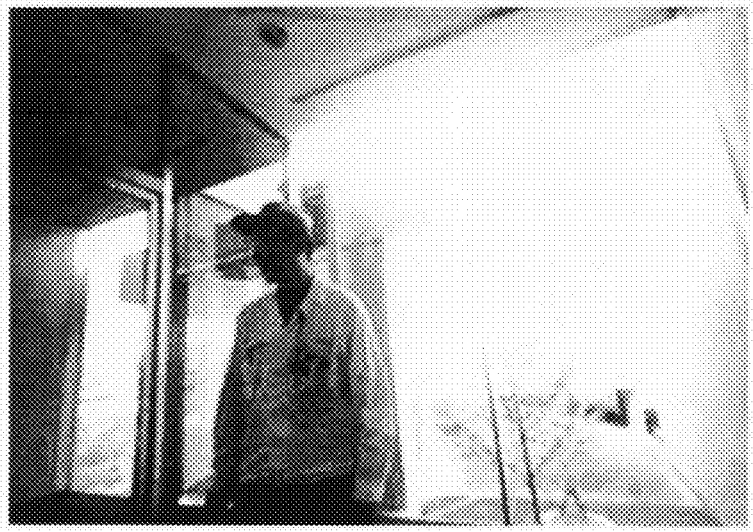
FIG. 8 is an example of an image used in the processing of FIG. 7.
Figure 9:
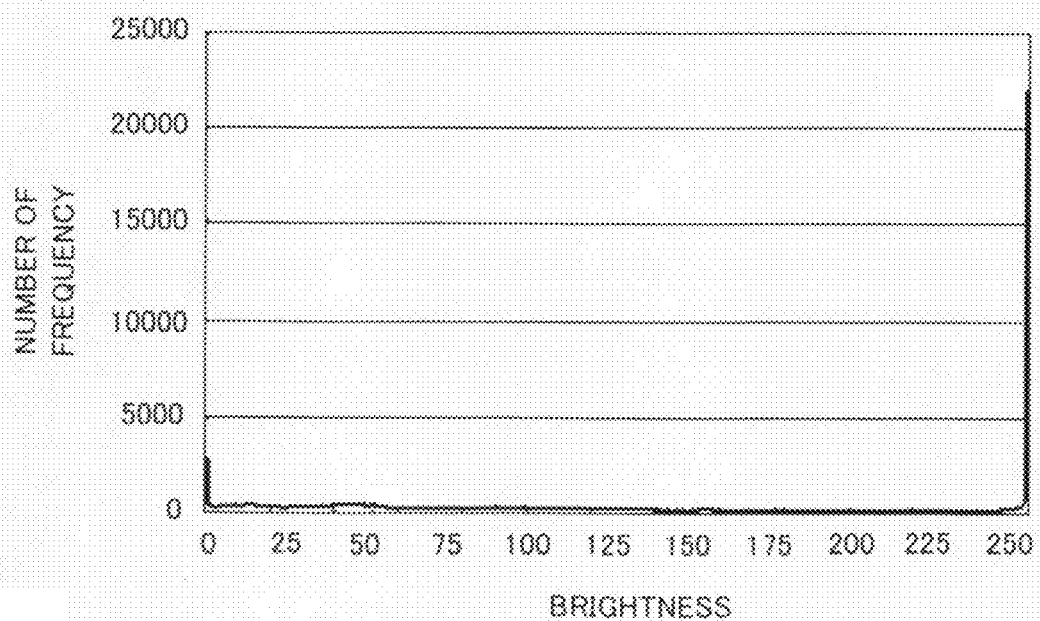
FIG. 9 is a table of an ordinary brightness histogram (which does not take distance into account) of the image shown in FIG. 8.

In the imaging situation shown in FIG. 8, if an ordinary brightness histogram as shown in FIG. 9 is calculated, the number of white-out (saturated) pixels greatly exceeds the number of black-out (insufficiently sensitive) pixels, so that if exposure adjustment is made based thereon, the object (of imaging) would be blacked out. Moreover, since in FIG. 8 the object (of imaging) is located a little leftward of the image center, basing the exposure adjustment on the brightness information at the image center region would lead to the same result.

Figure 10:
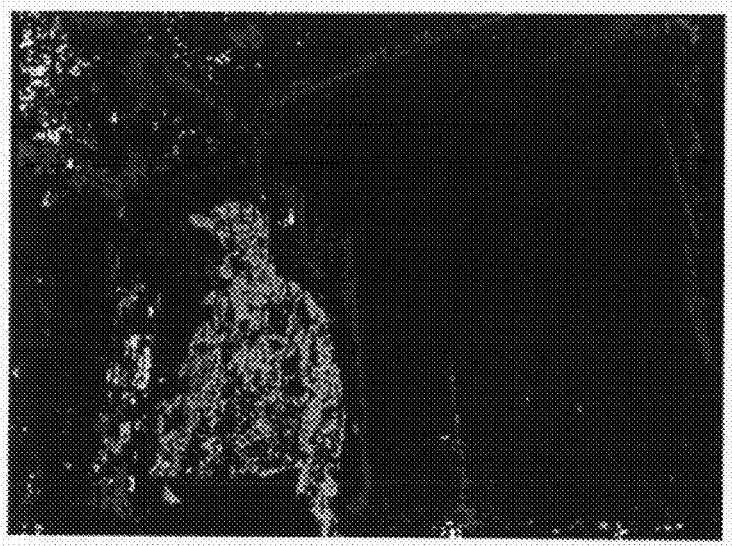
FIG. 10 is a view showing a parallax image of the image shown in FIG. 8.
Figure 11:
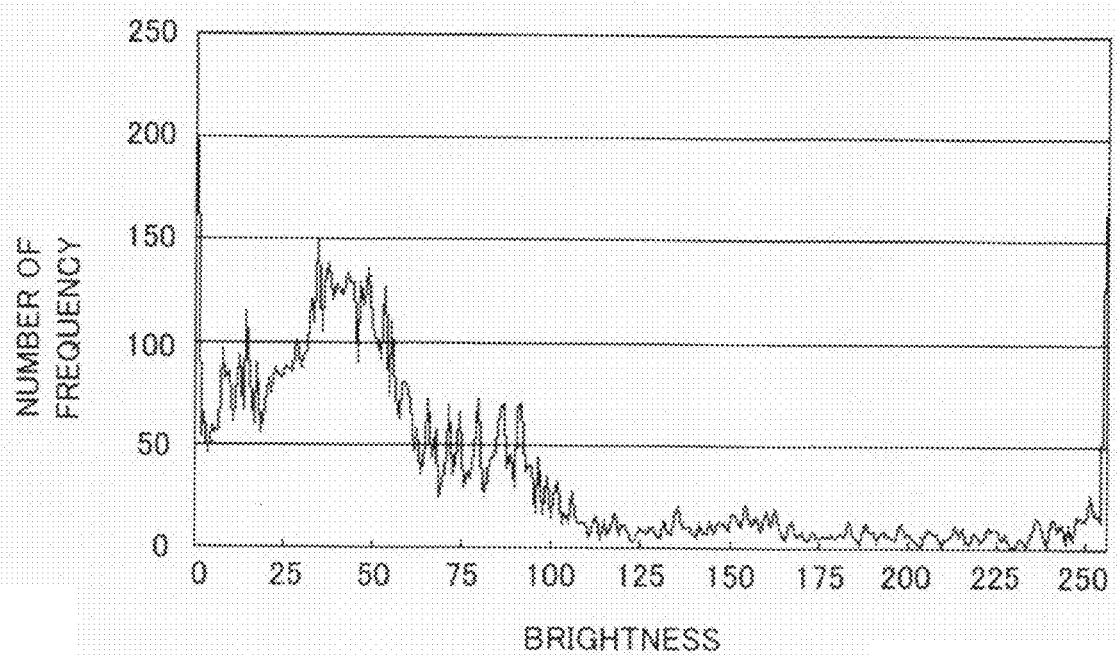
FIG. 11 is a table of a distance-weighted brightness histogram of the image shown in FIG. 8.

Therefore, a parallax image like that shown in FIG. 10 is obtained and a distance-weighted brightness histogram like that shown in FIG. 11 is calculated. With the histogram shown in FIG. 11, when the value of pixels near the cameras 82 are emphasized, the frequency of white-out and black-out is substantially the same to optimize exposure adjustment. The image shown in FIG. 8 was obtained by adjusting exposure based on such a distance-weighted brightness histogram.

Further, in the processing of FIG. 7, when the object (of imaging) once comes to be present in the image as shown in FIG. 8, it may thereafter disappear from the image with time-course movement. Therefore, when the result in S102 is YES, meaning that the object (of imaging) is present in the image, or when the result in S102 is NO but the counter value is found in S108 to be less than the threshold value B (e.g., several frames), the average brightness is calculated as a weighted average between the average brightness of the current frame and that of the preceding frame (S104 or S110). When the result in S108 is NO, meaning that the counter value is greater than the threshold value, the past imaging data is set aside and the average brightness is defined as the average brightness of the pixels of the whole image (S114).

Further, the processing of FIG. 7 also encompasses the case of a finding that no object (of imaging) is present and the region where the maximum brightness of the image is present is defined as a high-brightness imaging region. Also in such a case, the result in S108 is NO, and at the time the counter value reaches the threshold value B, the program goes to S114, in which the average brightness is defined as the average brightness of the pixels of the whole image (S114).

When the average brightness is between the threshold value C and threshold value D, the shutter speed shift amount is calculated in accordance with Eq. 4 to fall midway between the two threshold values (S118).

In other cases, the reference value is first calculated in accordance with Eq. 5.

Eq. 5 will be explained with reference to FIG. 11.

The "number of pixels greater than an effective brightness threshold value" is, for example, the number of pixels whose brightness is greater than 25, and the "number of pixels less than an effective brightness threshold value" is, for example, the number of pixels whose brightness is less than 225. So, for example, the reference value is the difference obtained by subtracting the average for the pixels of brightness greater than 25 and less than 225 from the average brightness, and the amount of change in shutter speed is calculated not as ½ of the threshold values C, D but by subtracting this reference value from the average brightness.

The explanation of the flowchart of FIG. 6 will be continued. Next, in S24, it is checked whether the shutter speed shift amount calculated in S118 or S122 (i.e., the set exposure parameter) is within a predetermined range. When the result is YES, the program goes to another routine not shown in the drawings to conduct imaging after changing the shutter speed in accordance with the calculated shift amount. Since imaging at appropriate brightness is therefore possible, the remaining steps of the flowchart of FIG. 6 are skipped.

When the result in S24 is NO, the program goes to S26, in which high-brightness imaging region removal necessity determination is conducted.

Figure 12:
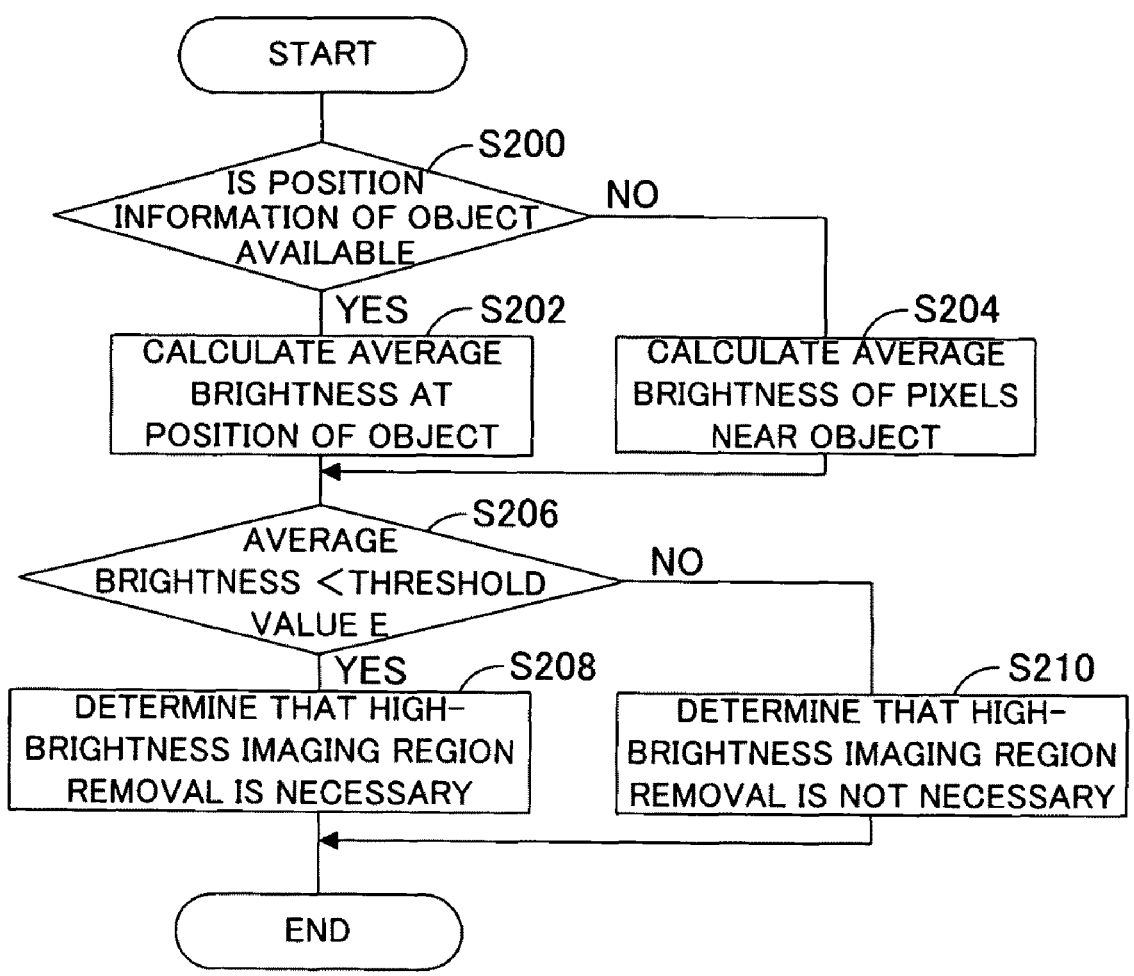
FIG. 12 is a subroutine flowchart of the processing of high-brightness imaging region removal necessity determination shown in the flowchart of FIG. 6.

FIG. 12 is a subroutine flowchart of this determination, which is executed by the high-brightness imaging region removal necessity determiner 26d.

In S200, it is checked whether position information of the object (of imaging) is available. This check is made based on information obtained by the processing in S12 of the flowchart of FIG. 6 or in the flowchart of FIG. 7.

When the result in S200 is YES, the program goes to S202, in which the average brightness at the position of the object (of imaging) is calculated. When the result is NO, the program goes to S204, in which the average brightness of pixels at relatively short distance in the image, for example, within several meters, is calculated. The processing from S200 to S204 is similar to the processing of S10 to S14 in the flowchart of FIG. 6.

The program then goes to S206, in which it is checked whether the calculated average brightness is less than a threshold value E. The check in S206 is for determining whether the imaging is being done under back-lighting or front-lighting condition. So the threshold value E is set to an appropriate value enabling this check.

When the result in S206 is YES, back-lighting prevails, from which it follows that the object (of imaging) and the like will black out and be low in brightness, so that appropriate exposure for imaging the object (of imaging) cannot be achieved. The program therefore goes to S208, in which it is determined that a high-brightness imaging region needs to be removed. When the result in S206 is NO, such problems are not experienced, so the program goes to S210, in which it is determined that high-brightness imaging region removal is not required.

The explanation of the flowchart of FIG. 6 will be resumed. Next, in S28, it is checked whether it is found that high-brightness imaging region removal is unnecessary. When the result is YES, the remaining processing steps are skipped. When it is NO, the program goes to S30, in which high-brightness imaging region extraction is executed.

Figure 13:
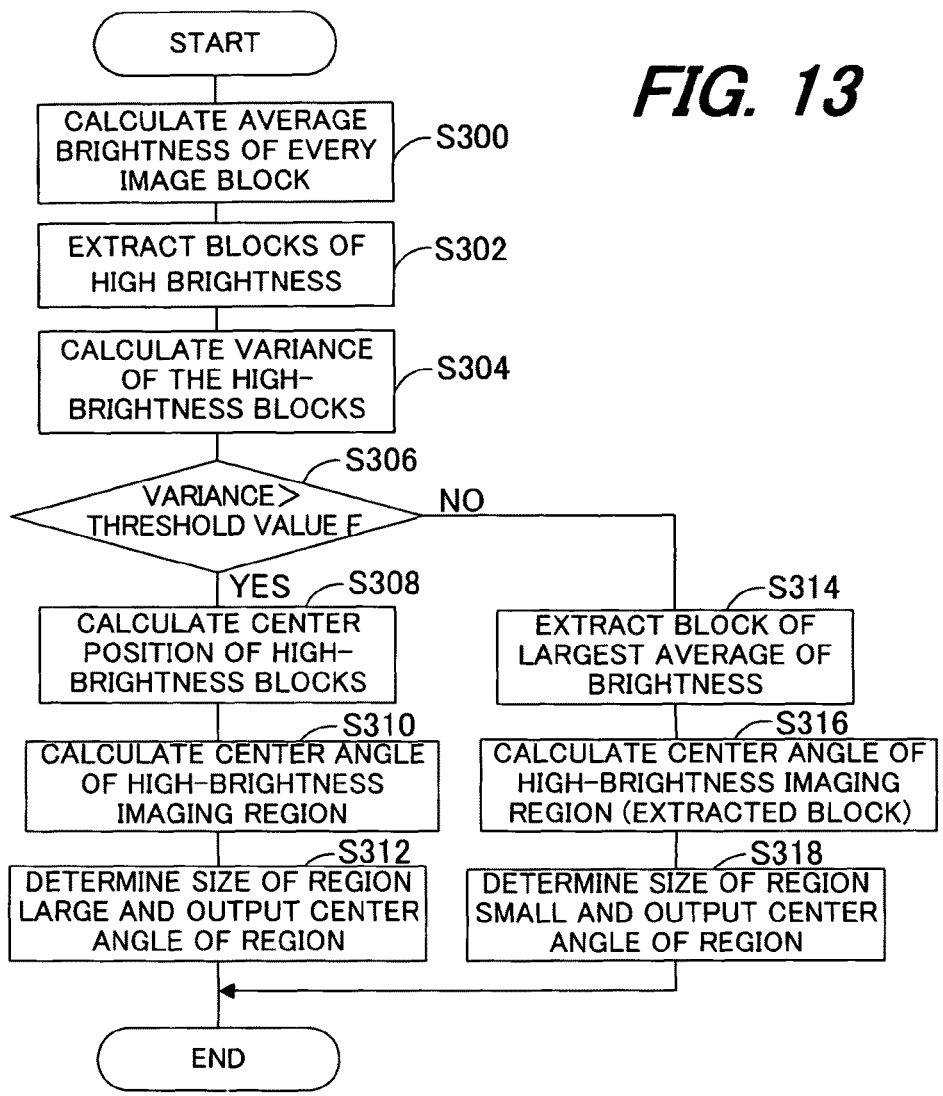
FIG. 13 is a subroutine flowchart of the processing of high-brightness imaging region extraction shown in the flowchart of FIG. 6.

FIG. 13 is a subroutine flowchart of this extraction, which is executed by the high-brightness imaging region extractor 26e.

In S300, the average brightness of every image block of predetermined size is calculated, in other words the average brightnesses of the blocks are calculated one by one. "Block" as termed here means a unit area of 10×10 pixels. The 320× 240 pixels of the cameras 82 are divided into blocks of this predetermined size (unit area) and the average brightnesses of the blocks are calculated individually.

Next, in S302, blocks of high brightness, specifically ones whose brightness exceeds an appropriately set threshold value, are extracted, whereafter the program goes to S304, in which the variance thereof, specifically, the spread of portions of high brightness, is calculated.

Next, in S306, it is checked whether the calculated variance is greater than an appropriately set threshold value F. When the result in S306 is YES, it is concluded that a bright region spreads widely, similarly to on the right side of FIG. 8, so the program goes to S308, in which the center position of the high-brightness blocks is calculated based on camera parameters received from the cameras 82.

Next, in S310, the center angle of the high-brightness imaging region, i.e., the angle with respect to the calculated center position, is calculated, whereafter the program goes to S312, in which the size of the high-brightness imaging region is determined to be large, and the determination result and the center angle of the high-brightness imaging region calculated in S310 are outputted. Thus when the average brightness is larger than the threshold value F, the region is determined to be a high-brightness imaging region and the position and angle of the high-brightness imaging region in a stage coordinate system are calculated.

When the result in S306 is NO, the program goes to S314, in which the block of largest average brightness among the high-brightness blocks is extracted, to S316, in which the center angle of the high-brightness imaging region, specifically the angle with respect to the extracted block of largest average brightness, is calculated based on camera parameters, and to S318, in which the size of the high-brightness imaging region is determined to be small, and the determination result and the center angle calculated in S316 are outputted.

In other words, when the average brightness is not larger than the threshold value, the block among individual blocks of the image (of the predetermined size) whose average brightness is largest is determined to be the center of a high-brightness imaging region and the position and angle of the high-brightness imaging region in the stage coordinate system are calculated.

The explanation of the flowchart of FIG. 6 will be continued. Next, in S32, behavior generation is executed.

Figure 14:
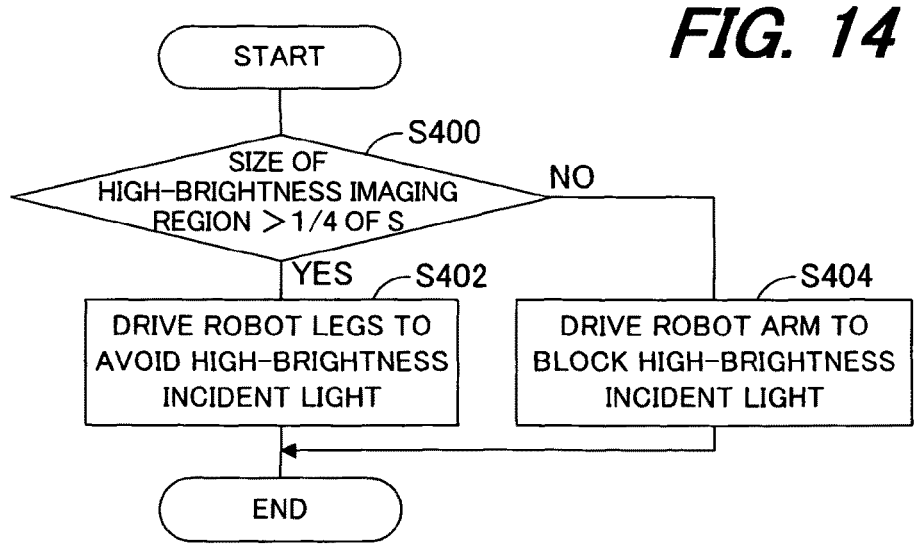
FIG. 14 is a subroutine flowchart of the processing of behavior generation shown in the flowchart of FIG. 6.

FIG. 14 is a subroutine flowchart of this processing, which is executed by the behavior generator 26g.

In S400, it is checked whether the size of the high-brightness imaging region outputted in S312 or S318 of the flowchart of FIG. 13 is greater than ¼ of S, where "S" is the image area. The check in S400 is thus for determining whether the size of the high-brightness region is larger than ¼ the image area.

When the result in S400 is YES, the size of the high-brightness imaging region is large, so the program goes to S402, in which the legs 12 of the robot 10 are driven to change the orientation of the body 14 (and head 16), thereby producing an action (generating behavior) for avoiding (preventing entry of) high-brightness incident light.

When the result in S400 is NO, the size of the high-brightness imaging region is relatively small, so the program goes to S404, in which the arm 20R or 20L of the robot 10 is driven to extend as far as possible, thereby producing and action (generating behavior) for blocking high-brightness incident light with the hand 22R or 22L and thus removing the high-brightness imaging region from the image.

As set out in the foregoing, this embodiment is configured to have a camera exposure controller having at least two imaging devices (CCD cameras 82) mounted on a mobile object (robot 10) for taking an image, through stereo-imaging, utilizing incident light from external world (ambience) in which an object of imaging, i.e., a human being is present, specifically for taking an image utilizing the principle of stereo-imaging, comprising: exposure parameter setting means for generating a brightness histogram of the image taken by the imaging devices and setting exposure parameters including a shutter speed based on the generated brightness histogram (ECU 26, stereo processor 26a, histogram generator 26b, exposure parameter setting unit 26c, S10 to S22, and S100 to S122); high-brightness imaging region removal necessity determining means for determining whether the set exposure parameters are within a predetermined range, and when they are found to be out of the predetermined range, for determining whether a high-brightness imaging region is present in the image due to high-brightness incident light, and when the high-brightness imaging region is present in the image, for determining whether it is necessary to remove the high-brightness imaging region (ECU 26, high-brightness imaging region removal necessity determiner 26d, S16 to S26, and S200 to S210, S302); and high-brightness imaging region extraction and removal means for extracting the high-brightness imaging region and for removing it from the image, when it is determined that removal of the high-brightness imaging region is necessary (ECU 26, high-brightness imaging region extractor 26e, behavior generator 26g, S28, S30, S32, S300 to S318, and S400 to S404). The camera exposure controller according to this embodiment therefore enables the object to be imaged at suitable brightness even when a bright light source such as the sun is within the angle of view of the cameras 82.

In the controller, the exposure parameter setting means calculates the brightness of the object (of imaging) in the image and the maximum brightness of the whole image, generates the brightness histogram with respect to the calculated brightnesses, and sets the exposure parameters including the shutter speed based on the generated brightness histogram, specifically based on the size of the generated brightness histogram (S10 to S22 and S100 to S122). Owing to this configuration, the controller according to this embodiment having the foregoing effects further enables the exposure parameters to be accurately set even when a bright light source such as the sun is within the angle of view of the cameras 82, thereby enabling the object (of imaging) to be imaged at suitable brightness.

In the controller, the object of imaging is a human being and the exposure parameter setting means calculates the brightness of the human being's face and the maximum brightness of the whole image (S10 to S22 and S100 to S122). Owing to this configuration, the exposure parameters can be accurately set not only when a bright light source such as the sun but also when a low-brightness imaging region such as a human face is within the angle of view of the cameras, thereby enabling the object to be imaged at suitable brightness.

In the controller, the high-brightness imaging region extraction and removal means extracts the high-brightness imaging region by calculating an average brightness of every block of the image of predetermined size, extracting each block whose calculated average brightness is greater than a predetermined brightness, and by calculating a center position of the extracted blocks (S300 to S312). Owing to this configuration, the controller according to this embodiment having the foregoing effects further enables the high-brightness imaging region imaged due to high-brightness incident light from the sun or the like to be reliably extracted and removed from the image.

In the controller, the high-brightness imaging region extraction and removal means calculates an average brightness of every block of the image of predetermined size, extracts one of the blocks whose calculated average brightness is greatest, and extracts the high-brightness imaging region based on the extracted block (S300 to S306 and S314 to S318). Owing to this configuration, the embodiment having the foregoing effects similarly enables the high-brightness imaging region to be reliably extracted and removed from the image.

In the controller, the high-brightness imaging region extraction and removal means identifies the position and angle of the high-brightness imaging region in the image and generates a predetermined behavior in the mobile object for removing the identified high-brightness imaging region from the image (S400 to S404). Owing to this configuration, the controller according to this embodiment having the foregoing effects further enables the high-brightness imaging region to be reliably removed from the image.

Figure 15:
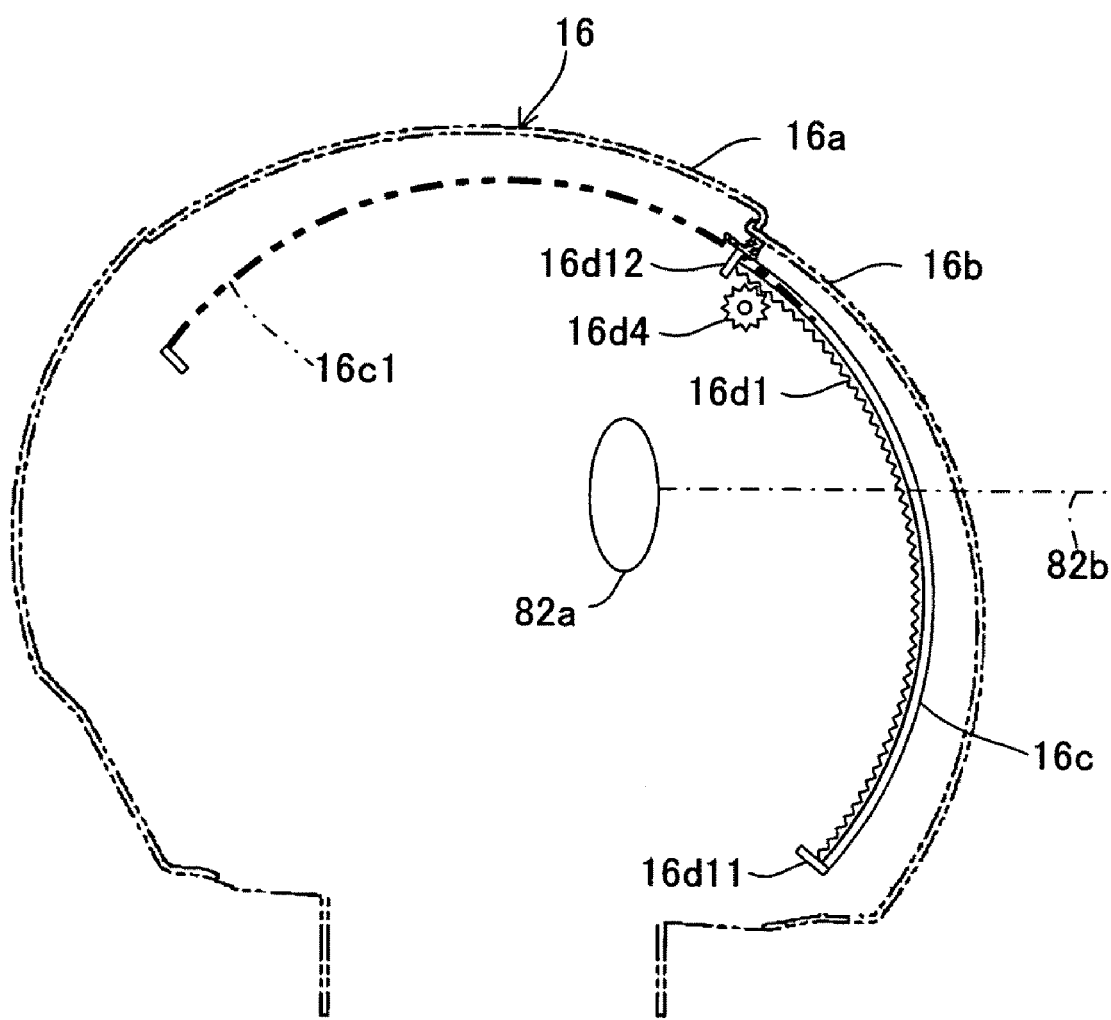
FIG. 15 is a partial cross-sectional view of the head of a robot (shown in FIG. 1) on which a camera exposure controller according to a second embodiment of this invention is mounted.
Figure 16:
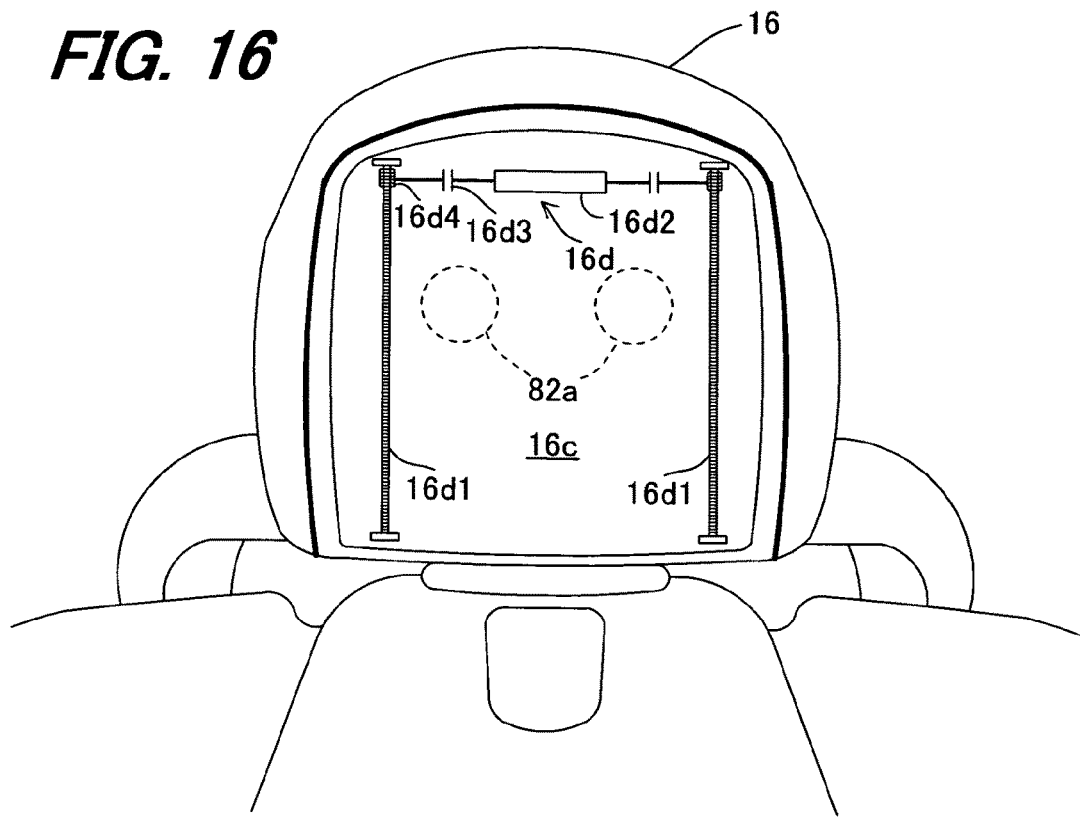
FIG. 16 is a front view of the head of the robot shown in FIG. 15.

FIG. 15 is a partial cross-sectional view of the head 16 of a robot on which a camera exposure controller according to a second embodiment of this invention is mounted and FIG. 16 is a front view thereof.

As shown in the drawings, the head 16 is covered from the middle to the back by a helmet 16a and its front is covered by a face 16b. The helmet 16a is made of opaque and thin hard plastic and the face 16b is made of transparent and thin hard plastic.

A visor (filter) 16c is installed inward of the face 16b. The visor 16c is also made of thin plastic, namely of a thin plastic material that, like a camera ND (Neutral Density) filter, absorbs light of all wavelengths, thereby reducing the amount of light. As shown in FIGS. 15 and 16, the visor 16c, like the face 16b, has a semicircular shape when viewed from the side, and a generally rectangular shape when viewed from the front.

A drive mechanism 16d is connected to the visor 16c.

Figure 17:
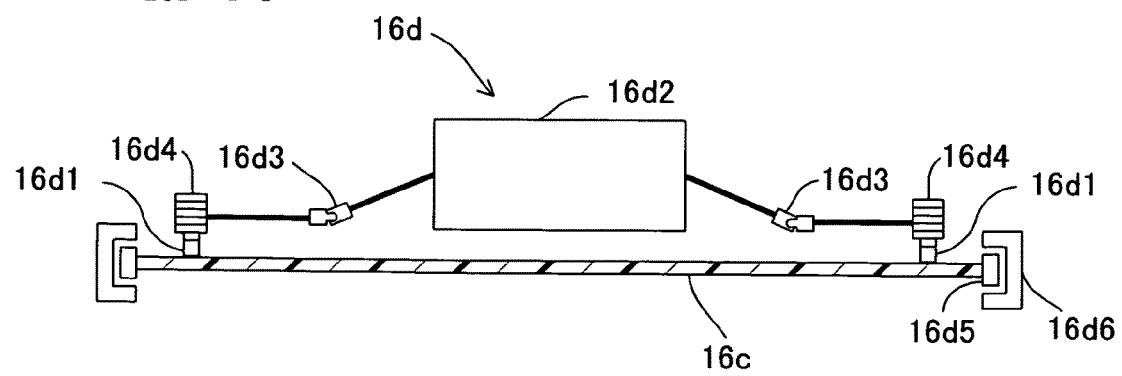
FIG. 17 is an explanatory view schematically showing the details of a drive mechanism shown in FIG. 16.

The structural details of the drive mechanism 16d are shown schematically in FIG. 17. As shown, the drive mechanism 16d is mounted inward of and near the opposite edges of the visor 16c. It comprises two racks 16d1 that extend vertically, a single electric motor 16d2 installed near the upper ends of the racks 16d1, pinion gears 16d4 connected to the motor 16d2 through universal joints 16d3 and engaged with the racks 16d1, guides 16d5 fixed to the opposite ends of the racks 16d1, more precisely to the opposite ends of the visor 16c and guide rails 16d6 (not shown in FIG. 16) for guiding the guides 16d5.

With this arrangement, when the motor 16d2 is driven to rotate forward, for example, the torque is transmitted to the pinion gears 16d4 through the universal joints 16d3 to drive the racks 16d1 downward to stop at the position where their lower ends hit lower stoppers 16d11. When the motor 16d2 is rotated in reverse, the racks 16d1 are driven upward to stop at the position where their lower ends hit upper stoppers 16d12.

Since the racks 16d1 are fixed to the visor 16c, driving the racks 16d1 downward lowers the visor 16c, so that, as shown in FIGS. 15 and 16, it is moved to a position in front of lenses 82a of the cameras 82 located inward of the face 16b, namely to a position on the axes 82b of incident light from the external world in which a human being or other object to be imaged is present, whereby the visor 16c functions as an ND filter for the cameras 82.

When the drive mechanism 16d is driven in reverse to drive the racks 16d1 upward, the visor 16c is retracted to a standby position inside the helmet 16a (to a position away from the incident light axes (indicated by an imaginary line 16c1)).

Figure 18:
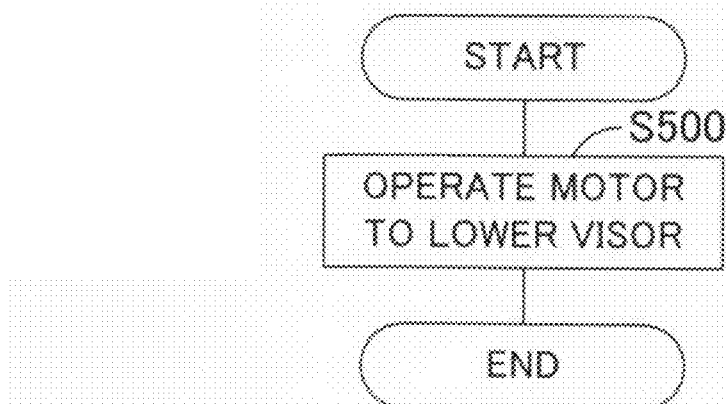
FIG. 18 is a subroutine flowchart showing the processing of behavior generation shown in the flowchart of FIG. 6 according to the second embodiment.
Figure 19:
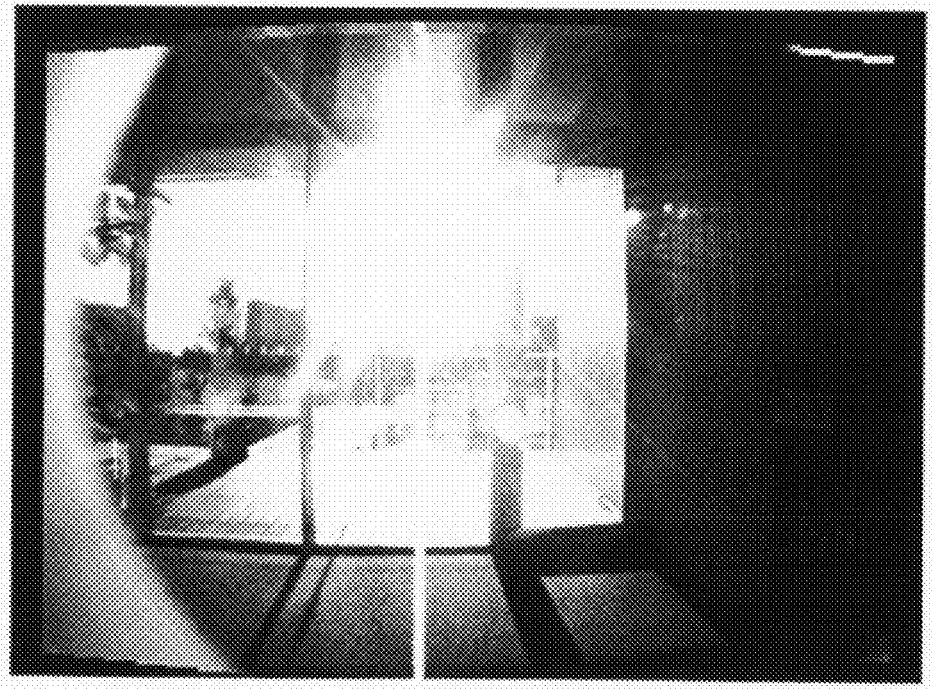
FIG. 19 is a view showing an example of a sight that is planned to be imaged using the camera exposure controller according to the embodiments.

FIG. 18 is a flowchart showing the behavior generation processing of S32 in a flowchart of the second embodiment (not shown) identical to FIG. 6 in the first embodiment.

In the second embodiment, in S500 the motor 16d2 is operated to lower the visor 16c. Specifically, since the high-brightness imaging region is extracted by the processing in S30 in the flowchart identical to FIG. 6 in the first embodiment, the visor (filter) 16c is driven to a position on the axes 82b of incident light. The visor 16c absorbs light of all wavelengths, i.e., it reduces the amount of light. Owing to this property, it can reduce the brightness of a bright imaging region to enable imaging of a human being or other object (of imaging) at appropriate brightness. The second embodiment does not differ from the first embodiment in other structural aspects.

As set out in the foregoing, the second embodiment is configured to have a camera exposure controller having at least two imaging devices (CCD cameras 82) mounted on a mobile object (robot 10) for taking an image, through stereo-imaging, utilizing incident light from external world (ambience) in which an object of imaging, i.e., a human being is present, specifically for taking an image utilizing the principle of stereo-imaging, comprising: exposure parameter setting means for generating a brightness histogram of the image taken by the imaging devices and setting exposure parameters including a shutter speed based on the generated brightness histogram (ECU 26, stereo processor 26a, histogram generator 26b, exposure parameter setting unit 26c, S10 to S22, and S100 to S122); high-brightness imaging region removal necessity determining means for determining whether the set exposure parameters are within a predetermined range, and when they are found to be out of the predetermined range, for determining whether a high-brightness imaging region is present in the image due to high-brightness incident light, and when the high-brightness imaging region is present in the image, for determining whether it is necessary to remove the high-brightness imaging region (ECU 26, high-brightness imaging region removal necessity determiner 26d, S16 to S26, and S200 to S210, S302); high-brightness imaging region extraction and removal means for extracting the high-brightness imaging region and removing it from the image, when it is determined that removal of the high-brightness imaging region is necessary (ECU 26, high-brightness imaging region extractor 26e, behavior generator 26g, S28, S30, S32, S300 to S318, and S400 to S404); a filter (visor) 16c made movable between a position on an axis of the incident light and a position 16c1 away from the axis; and filter moving means for moving the filter 16c to the position on the axis to reduce the brightness of the high-brightness imaging region, when the high-brightness imaging region is present in the image (ECU 26, behavior generator 26g, S32 and S400). Owing to this configuration, it is possible by moving the filter (visor) 16c to a position intercepting the optical axes to image a human being or other object (of imaging) at suitable brightness even when a bright light source such as the sun is within the angle of view of the mounted CCD cameras 82.

In the controller, wherein the filter comprises a visor 16c constituted to be movable by a drive mechanism 16d between the position on the axis 82b at a front of a head 16 of the mobile object and the position 16c1 away from the axis at a top of the head 16, and the filter moving means operates the drive mechanism 16d to move the visor 16c to the position on the axis. Owing to this configuration, the controller according to the second embodiment having the foregoing effects can further reliably position filter 16c constituted as a visor on the optical axes.

In the controller, the drive mechanism 16d comprises at least a rack 16d1 attached to the visor 16c, gears (pinion gears) 16d4 engaged with the rack, and an electric motor 16d2 for driving the gears. Owing to this configuration, the filter 16c constituted as a visor can be still more reliably positioned on the axes 82b by means of a simple arrangement.

In the foregoing explanation, the object (of imaging) was presumed to be a human being but it can instead be some other object, such as a tool or workpiece, associated with the task performed by the robot 10.

In the aforesaid configurations, the presence/absence of an object (of imaging) is determined from the output of the IC tag signal receiver 94, which receives identification information transmitted by the IC tag 92 carried (worn) by the object (of imaging). However, the determination can instead be made from the output of the cameras 82. Alternatively, the robot 10 can be informed of the presence/absence of an object (of imaging) by inputting a command from the outside.

In the foregoing explanation, a legged mobile robot, specifically a biped walking robot, was taken as an example of the mobile object. However, this is not a limitation and the mobile object can be of any kind capable of moving autonomously.

Japanese Patent Application Nos. 2007-224753 and 2007-224754 both filed on Aug. 30, 2007, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A camera exposure controller having at least two imaging devices mounted on a mobile object for taking an image, through stereo-imaging, utilizing incident light from external world in which an object of imaging is present, comprising:
   exposure parameter setting means for generating a brightness histogram of the image taken by the imaging devices and setting exposure parameters including a shutter speed based on the generated brightness histogram;
   high-brightness imaging region removal necessity determining means for determining whether the set exposure parameters are within a predetermined range, and when they are found to be out of the predetermined range, for determining whether a high-brightness imaging region is present in the image due to high-brightness incident light, and when the high-brightness imaging region is present in the image, for determining whether it is necessary to remove the high-brightness imaging region; and
   high-brightness imaging region extraction and removal means for extracting the high-brightness imaging region and for removing it from the image, when it is determined that removal of the high-brightness imaging region is necessary.

2. The controller according to claim 1, wherein the exposure parameter setting means calculates the brightness of the object in the image and a maximum brightness of the whole image, generates the brightness histogram with respect to the calculated brightness, and sets the exposure parameters including the shutter speed based on the generated brightness histogram.

3. The controller according to claim 2, wherein the object of imaging is a human being and the exposure parameter setting means calculates the brightness of the human being's face and the maximum brightness of the whole image.

4. The controller according to claim 1, wherein the high-brightness imaging region extraction and removal means extracts the high-brightness imaging region by calculating an average brightness of every block of the image of predetermined size, extracting each block whose calculated average brightness is greater than a predetermined brightness, and calculating a center position of the extracted blocks.

5. The controller according to claim 1, wherein the high-brightness imaging region extraction and removal means calculates an average brightness of every block of the image of predetermined size, extracts one of the blocks whose calculated average brightness is greatest, and extracts the high-brightness imaging region based on the extracted block.

6. The controller according to claim 1, wherein the high-brightness imaging region extraction and removal means identifies the position and angle of the high-brightness imaging region in the image and generates a predetermined behavior in the mobile object for removing the identified high-brightness imaging region from the image.

7. The controller according to claim 1, further including:
a filter made movable between a position on an axis of the incident light and a position away from the axis; and
filter moving means for moving the filter to the position on the axis to reduce the brightness of the high-brightness imaging region, when the high-brightness imaging region is present in the image.

8. The controller according to claim 7, wherein the filter comprises a visor constituted to be movable by a drive mechanism between the position on the axis at a front of a head of the mobile object and the position away from the axis at a top of the head, and the filter moving means operates the drive mechanism to move the visor to the position on the axis.

9. The controller according to claim 8, wherein the drive mechanism comprises at least a rack attached to the visor, gears engaged with the rack, and an electric motor for driving the gears.

10. A method of controlling camera exposure having at least two imaging devices mounted on a mobile object for taking an image, through stereo-imaging, utilizing incident light from external world in which an object of imaging is present, comprising the steps of:
generating a brightness histogram of the image taken by the imaging devices and setting exposure parameters including a shutter speed based on the generated brightness histogram;
determining whether the set exposure parameters are within a predetermined range, and when they are found to be out of the predetermined range, determining whether a high-brightness imaging region is present in the image due to high-brightness incident light, and when the high-brightness imaging region is present in the image, determining whether it is necessary to remove the high-brightness imaging region; and
extracting the high-brightness imaging region and for removing it from the image, when it is determined that removal of the high-brightness imaging region is necessary.

11. The method according to claim 10, wherein the step of generating calculates the brightness of the object in the image and a maximum brightness of the whole image, generates the brightness histogram with respect to the calculated brightness, and sets the exposure parameters including the shutter speed based on the generated brightness histogram.

12. The method according to claim 11, wherein the object of imaging is a human being and the step of generating calculates the brightness of the human being's face and the maximum brightness of the whole image.

13. The method according to claim 10, wherein the step of extracting extracts the high-brightness imaging region by calculating an average brightness of every block of the image of predetermined size, extracting each block whose calculated average brightness is greater than a predetermined brightness, and by calculating a center position of the extracted blocks.

14. The method according to claim 10, wherein the step of extracting calculates an average brightness of every block of the image of predetermined size, extracts one of the blocks whose calculated average brightness is greatest, and extracts the high-brightness imaging region based on the extracted block.

15. The method according to claim 10, wherein the step of extracting identifies the position and angle of the high-brightness imaging region in the image and generates a predetermined behavior in the mobile object for removing the identified high-brightness imaging region from the image.

16. The method according to claim 10, having a filter made movable between a position on an axis of the incident light and a position away from the axis; and further including the step of:
moving the filter to the position on the axis to reduce the brightness of the high-brightness imaging region, when the high-brightness imaging region is present in the image.

17. The method according to claim 16, wherein the filter comprises a visor constituted to be movable by a drive mechanism between the position on the axis at a front of a head of the mobile object and the position away from the axis at a top of the head, and the step of moving operates the drive mechanism to move the visor to the position on the axis.

18. The method according to claim 17, wherein the drive mechanism comprises at least a rack attached to the visor, gears engaged with the rack, and an electric motor for driving the gears.

* * * * *